US012717792B2

(12) United States Patent
Chen et al.

(10) Patent No.: US 12,717,792 B2
(45) Date of Patent: Aug. 25, 2026

(54) PUSH DOWN TOP-K INFORMATION FOR GROUP-BY GROUPING SETS AND WINDOW FUNCTION OPERATOR

(71) Applicant: Snowflake Inc., Bozeman, MT (US)

(72) Inventors: Bowei Chen, San Bruno, CA (US); Corbin McElhanney, San Mateo, CA (US); Eric Alan Musser, Redwood City, CA (US); Gopal Vijayaraghavan, South San Francisco, CA (US)

(73) Assignee: Snowflake Inc., Bozeman, MT (US)

( * ) Notice: Subject to any disclaimer, the term of this patent is extended or adjusted under 35 U.S.C. 154(b) by 18 days.

(21) Appl. No.: 19/038,172

(22) Filed: Jan. 27, 2025

(65) Prior Publication Data

US 2026/0220138 A1 Jul. 30, 2026

(51) Int. Cl.
*G06F 16/24* (2019.01)
*G06F 16/242* (2019.01)
*G06F 16/2455* (2019.01)

(52) U.S. Cl.
CPC ...... *G06F 16/24556* (2019.01); *G06F 16/244* (2019.01)

(58) Field of Classification Search
None
See application file for complete search history.

(56) References Cited

U.S. PATENT DOCUMENTS 11,880,369 B1 1/2024 Heimel et al.
12,204,537 B1 * 1/2025 Teflioudi ........... G06F 16/24542
2012/0226693 A1 * 9/2012 Zhang .............. G06F 16/24537 707/E17.069
2016/0378827 A1 * 12/2016 Bondalapati ...... G06F 16/24542 707/718
2021/0263930 A1 * 8/2021 Fender .................... G06F 12/12
2021/0365456 A1 * 11/2021 Kondiles ........... G06F 16/24553
2021/0386017 A1 * 12/2021 Mixon ................... A01D 34/49
2024/0386017 A1 * 11/2024 Teflioudi ........... G06F 16/24542

* cited by examiner

*Primary Examiner* — Augustine K. Obisesan
(74) *Attorney, Agent, or Firm* — Schwegman Lundberg & Woessner, P.A.

(57) ABSTRACT

Various example embodiments described herein provide for systems, methods, devices, instructions, and the like for optimizing a query plan for executing a query by pushing down top-k information in the query plan with respect to a group-by grouping sets operator or a window function operator, which can be used within a data platform (e.g., database) environment. In particular, various example embodiments enable information from a top-k operator of a query plan to be pushed down the query plan and enable pushing the information to a select operator (e.g., aggregation operator) positioned below the top-k operator that implements the group-by grouping sets operator or the window function operator.

20 Claims, 7 Drawing Sheets

PUSH DOWN TOP-K INFORMATION FOR GROUP-BY GROUPING SETS AND WINDOW FUNCTION OPERATOR

TECHNICAL FIELD

Embodiments described herein relate to data platforms and, more particularly, to systems, methods, devices, and instructions for optimizing a query plan for executing a query by pushing down top-k information in the query plan with respect to a group-by grouping sets operator or a window function operator, which can be used within a data platform (e.g., database) environment.

BACKGROUND

Database query optimization remains a critical challenge in modern data processing systems. Some queries involve the use of specialized operators, like window function operators and group-by operators, to perform complex analytical queries. A window function operator allows calculations across sets of rows related to the current row, enabling operations like ranking, running totals, and moving averages within partitioned result sets. A group-by operator extends traditional grouping capabilities by automatically generating multiple levels of aggregation in a single result set. A group-by operator can create a hierarchy of groupings, starting with the most granular level and progressively generating summary rows with fewer grouping keys until reaching a grand total.

BRIEF DESCRIPTION THE DRAWINGS

Various ones of the appended drawings merely illustrate various example embodiments of the present disclosure and should not be considered as limiting its scope. In the drawings, which are not necessarily drawn to scale, like numerals may describe similar components in different views. To easily identify the discussion of any particular element or act, the most significant digit or digits in a reference number refer to the figure number in which that element is first introduced.

DETAILED DESCRIPTION

Figure 1:
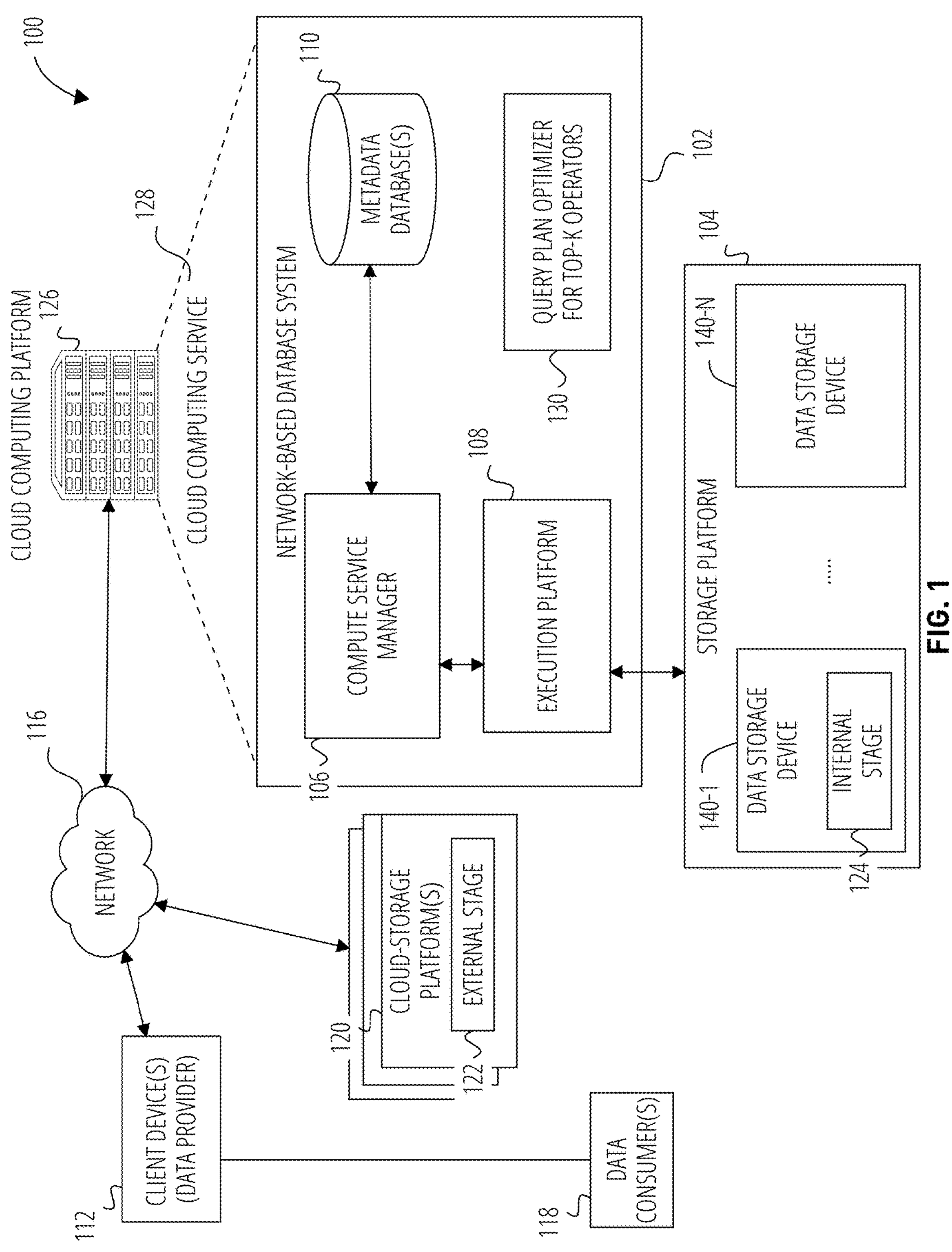
FIG. 1 illustrates an example computing environment comprising a database system in the example form of a network-based database system that includes a query plan optimizer, according to some example embodiments of the present disclosure.

Reference will now be made in detail to specific embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

When certain information is to be extracted from a database, a query statement may be executed against the database data. A data platform may process the query and return certain data according to one or more query predicates that indicate what information should be returned by the query. The data platform extracts specific data from the database and formats that data into a readable form. However, it can be challenging to execute queries on a very large table because a significant amount of time and computing resources are required to scan an entire table to identify data that satisfies the query.

Traditional database systems employ query optimizers that analyze and transform query plans to improve performance. These optimizers typically focus on basic transformations like pushing predicates below joins and reordering join operations. Current query optimizers face significant challenges when processing query plans that include specialized operators, like window function operators and group-by grouping sets operators, in conjunction with top-k operators. Top-k queries typically return a limited number of results ordered by specific criteria and comprise a query statement that includes a first clause to sort results of a query (also referred to herein as a "result set") in ascending or descending order (e.g., an ORDER BY clause in structured query language (SQL)), and a second clause that limits the result set to a specific number of results (e.g., a LIMIT or LIMIT OFFSET clause in SQL). Processing window function operators typically involves maintaining state across multiple rows within each partition, while group-by operators involve tracking multiple aggregation levels simultaneously. The handling of NULL values in certain group-by grouping sets operators (such as group-by rollup operators) is particularly important, as they are used to denote different levels of summarization in the results (e.g., in the rollup results).

Current systems often process these operators sequentially and maintain full intermediate results, which can lead to excessive memory usage and processing overhead. Additionally, traditional cost-based optimization models often select inefficient query plans, as they must make static decisions without runtime feedback about actual data characteristics and query performance. Many conventional implementations restrict optimization techniques to a small subset of aggregation functions and join types, limiting their broader applicability.

Further, the performance impact of these limitations becomes especially apparent when processing large datasets, where inefficient handling of window functions and group-by grouping sets operators can result in significant processing overhead and memory consumption. In particular, conventional query plan optimization is unable to apply top-k operation optimization with respect to queries with grouping sets (e.g., queries involving group-by grouping sets operations) or filters on window functions. This has meant that the full output of a table scan or a join needed to be processed by grouping sets and window function plan fragments, both of which usually appear late in a plan, and are relatively expensive. A grouping set operator, such as a group-by grouping sets operator, is generally performed by a query plan that splits an input into separate branches for each grouping set, where each branch comprises an aggregation operator (e.g., aggregator node) that groups by one of the grouping sets, and where the outputs of each branch is fed into a union operator (e.g., union-all operator). For large numbers of grouping sets, it can be very expensive to execute all these branches for a grouping set operator. A window function operator generally involves executing a query plan that includes an aggregation operator and that performs some kind of partitioning or sorting, which can be expensive for large inputs with processing of a full output of the table scan or join plan fragment.

Various example embodiments described herein provide for systems, methods, devices, instructions, and the like for optimizing a query plan for executing a query by pushing down top-k information in the query plan with respect to a group-by grouping sets operator or a window function operator, which can be used within a data platform (e.g., database) environment. In particular, various example embodiments enable information from a top-k operator of a query plan to be pushed down the query plan and enable pushing the information (also referred to herein as top-k information) to a select operator (e.g., aggregation operator) positioned below the top-k operator that implements the group-by grouping sets operator or the window function operator. For some example embodiments, the select operator is positioned below a union operator (e.g., union-all operator) that implements the group-by grouping sets operator or below a filter operator that implements the window function operator. For various example embodiments, the select operator comprises an aggregation operator that has a set of group-by keys of the aggregation operator that includes the set of order-by keys of the top-k operator.

According to various example embodiments, a data platform (e.g., a database system) generates a query plan based on a query (e.g., received from a client) for execution on a database, and optimizes (e.g., via a query plan optimizer) the query plan by determining (e.g., identifying) one or more opportunities to push down information of a top-k operator (e.g., top-k filter information) of the query plan with respect to a group-by grouping sets operator or a window function operator. For example, an example embodiment can push down top-k information to a group-by rollup operator within a query plan that is generated for the example query select c1, c2, sum(c3) from t group by rollup (c1, c2) order by c1, c2 limit 2. In another example, an example embodiment can push down top-k information to a window function operator within a query plan that is generated for the example query select * from (select c1, c2, sum(c3), rank( ) over (partition by c1 order by c2) as rk from t group by c1, c2) where rk<=2 order by c1, c2 limit 2, where the filter on rk can be ignored because of how the window function's partition and order keys relate to the overall query. Where top-k information is pushed down with respect to a group-by grouping sets operator, this can be referred to as pushing top-k information through a grouping set. Where top-k information is pushed down with respect to a window function operator, this can be referred to as pushing top-k information through a window function filter.

For some example embodiments, with respect to a group-by grouping sets operator of a query plan, the group-by grouping sets operator is changed to apply a top-k operation based on information from a top-k operator of the query plan in response to determining that the group-by grouping sets operator is configured to cause nulls to appear after non-nulls. This can occur in one of multiple cases. For instance, the group-by grouping sets operator is configured to cause nulls to appear after non-nulls when the group-by grouping sets operator is configured for ascending order with nulls last or for descending order with nulls first. For some example embodiments, the group-by grouping sets operator is not configured to cause nulls to appear after non-nulls when the group-by grouping sets operator is configured for ascending order with nulls first or for descending order with nulls last.

For some example embodiments, with respect to a window function operator of a query plan, the window function operator is changed to apply a top-k operation based on information from a top-k operator of the query plan in response to determining that the window function operator satisfies a set of conditions. Depending on the example embodiment, the set of conditions can comprise (1) that the window function operator's set of partition keys is a prefix of a set of order-by keys of the top-k operator (e.g., partition by c1 is a prefix of order by c1, c2 in example query select * from (select c1, c2, sum(c3), rank( ) over (partition by c1 order by c2) as rk from t group by c1, c2) where rk<=2 order by c1, c2 limit 2), (2) that the window function operator's limit (e.g., limit constraint designated by "limit") is less than or equal to a limit (e.g., limit constraint designated by "limit") applied by the top-k operator (e.g., rk<=2 is equal to limit 2 in in example query select * from (select c1, c2, sum(c3), rank( ) over (partition by c1 order by c2) as rk from t group by c1, c2) where rk<=2 order by c1, c2 limit 2), or both (1) and (2). According to various example embodiments, where the top-k aggregation operator is configured to check a number of unique groups in ordered set (e.g., B-tree data structure) of the top-k aggregation operator, only condition (1) needs to be satisfied for the window function operator to be changed to apply a top-k operation based on information. For some example embodiments, the ordered set is used in place of another data structure, such as a hash table (e.g., hashmap).

Various example embodiments provide a technical solution to a technical problem that conventional optimization techniques cannot efficiently handle query plans involving top-k operators and a group-by grouping sets operator or a window function operator, which can lead to unnecessary processing of records that will ultimately be filtered out. In particular, the technical solution of some example embodiments provides a method for intelligently pushing a top-k operator down a query plan (e.g., to an aggregation operator in the query plan), which can include pushing the top-k operator through a group-by grouping sets operator or a window function operator in the query plan based on satisfaction of one or more conditions.

Use of various embodiments eliminates extra work when executing a query plan that includes a group-by grouping sets operator or a window function operator. As described herein, some example embodiments expand pushing down of top-k information (e.g., top-k hint) down a query plan with respect to group-by grouping sets operators and window function operators when one or more conditions are satisfied. Some example embodiments can render the need to process full outputs of table scans or plan fragments unnecessary, which can be useful when dealing with large data inputs. In particular, various example embodiments can reduce the number of rows flowing from a main table scan fragment of a query plan into a fragment of the query plan associated with a group-by grouping sets operator or a window function operator (e.g., window function filter), which can improve a data storage platform's (e.g., database system's) performance with respect to certain queries. Various example embodiments enable a data platform (e.g., a database system) to reduce or avoid excess records through a group-by grouping sets operator or a window function operator, which are typically very expensive and which can waste computational resources. Some example embodiments are implemented by a query compiler change to enable top-k information (e.g., top-k hint) push down after a group-by grouping sets operator or a window function operator in a query plan.

As used herein, a query plan (associated with a query) can comprise a tree structure with multiple nodes, where each node corresponds to a query plan operator or operation for executing the query on a database. For various example embodiments, a query plan defines how to extract specific data from the database (e.g., one or more tables or views of the database) and how to format the extracted data (e.g., into a readable form). Example query plan operators/operations can include, without limitation joins (e.g., inner or outer joins), aggregations, table scans, and filtering predicates. The query plan can be generated by parsing a query written in a structured language, such as Structured Query Language (SQL), that can be understood by a data platform (e.g., a database), and the query plan can determine what data should be located and how it should be returned. An individual query plan can be enhanced through various optimization techniques, such as pushing down query plan operators in the individual query plan (e.g., pushed below a join operator), adapting execution based on runtime metrics, and modifying query plan operator placement to reduce processing time and resource usage while maintaining semantic equivalence of the query.

As used herein, a table scan can comprise a query plan operator that reads data directly from a table or view of a database by examining all rows in a table/view to locate records that match a set of specified query predicates or conditions. A table scan operator can access the physical storage units where the tables/views are stored (e.g., files or blocks), and can extract the relevant data according to a set of query requirements. When performing a table scan, a table scan operator can examine a collection of records containing values of table/view attributes (e.g., columns) to identify and return data that satisfies a set of query conditions.

As used herein, a top-k operator can comprise a query plan operator that orders rows by a specified a set of order-by keys and limits output of the top-k operator to a specific number of rows (e.g., limit value). The top-k operator can maintain a data structure to track top-K groupings seen so far by the top-k operator based on the ordering specified by the set of order-by keys. The top-k operator can use a boundary value from the data structure to filter out rows that the top-k operator receives (from an operator positioned below the top-k operator in the query plan) and that would not be part of the final top-K results the top-k operator outputs. For some example embodiments, a top-k operator is included in a query plan for a query when the query includes a LIMIT clause that specifies the specific number of rows (e.g., limit value), which can further include an ORDER BY clause to specify the set of order-by keys.

As used herein, an aggregation operator can comprise a query plan operator that groups rows based on a set of specified grouping keys (also referred to herein as group-by keys), where the aggregation operator can apply an aggregate function (e.g., such as sum, count, or average function) to compute a value (e.g., summary value) for each unique grouping (e.g., identified by the set of grouping keys). The aggregation operator can use (e.g., maintain) a hash table to track unique combinations of a set of group-by keys used by the aggregation operator and can accumulate an aggregate value (e.g., sum, count, or average value) for each unique grouping. When processing input rows, the aggregation operator can first check if a grouping (associated with a unique group-by key or unique combination of group-by keys) already exists in the aggregation operator's data structure (e.g., hash table) being used to track unique groupings. If the grouping already exists in the data structure, an aggregate value (e.g., sum, count, or average value) is updated for that grouping; if the grouping does not already exist in the data structure, the grouping is added to the data structure (e.g., a new grouping is created for tracking). The aggregation operator can work in conjunction with a join operator to reduce the number of records that need to be processed by performing aggregation before an expensive join operator and can be placed at different levels in the query plan to optimize performance.

As used herein, a top-k aggregation operator can comprise a query plan operator that orders rows the top-k aggregation operator receives from another operator in the query plan (e.g., an operator positioned below the top-k aggregation operator) by a set of specified grouping keys (also referred to herein as group-by keys) and limits the output to a specific number of rows while tracking (e.g., maintaining) distinct groupings based on the set of group-by keys. Depending on the example embodiment, the top-k aggregation operator can track unique top-k groupings using a data structure, such as a heap or an ordered data structure (e.g., ordered set) of the top-k groupings seen so far (ordered by the query's ordering) and uses a boundary value of that the data structure to filter out records that are not in the current list of top-k groupings. The top-k aggregation operator can work in conjunction with an aggregation node in a query plan to efficiently track unique top-k groupings.

As used herein, a window function can comprise an analytic function that can be called in a query (e.g., SQL query) on a window of rows and used for various calculations, such as running totals, moving averages, and rankings. Where a window function is called in a query, the query can include syntax that specifies (e.g., using an OVER clause) a window over which the called window function operates, where the rows can be grouped by partitions (e.g., using a PARTITION BY clause) and the rows can be ordered within each partition (e.g., using an ORDER BY clause). For instance, syntax of the query can be as follows:

<function> ([<arguments>]) OVER ([<windowDefinition>]), where window Definition::=[PARTITION BY <expr1> [, . . . ]][ORDER BY <expr2> [ASC|DESC][NULLS {FIRST|LAST}][, . . . ]][<windowFrameClause>] and where windowFrameClause::={{ROWS|RANGE} . . . }.

As described herein, a group-by operator (and operations) can refer to one of several different types of group-by operators, including (without limitation) a group-by rollup operator, a group-by cube operator, a group-by grouping sets operator, and the like.

As used herein, a group-by grouping sets operator can comprise a query plan operator that extends a regular group-by operation by computing multiple group-by clauses in a single statement. Accordingly, a group-by grouping sets operator can be equivalent to the UNION of two or more GROUP BY operations in the same result set. With a group-by grouping sets operator, the group set is a set of dimension columns.

As used herein, a group-by rollup operator is a type of group-by grouping sets operator that generates multiple levels of aggregation, which can produce subtotal rows with progressively fewer grouping keys until reaching a grand total. Effectively, the group-by rollup operator can analyze data at multiple levels of granularity in a single result set. For example, when grouping by state and city columns, the group-by rollup operator can generate: (1) rows grouped by both state and city (base groupings); (2) rows grouped by state only (with nulls for city); and (3) a single grand total row (with nulls for both state and city). The group-by rollup operator can generate these additional aggregation levels by "rolling up" the grouping keys linearly and removing one key at a time to provide larger-grain summaries of the data. In comparison, a regular group-by operator only produces the base-level groupings. Where a group-by rollup operation is called in a query, the query can include syntax that specifies a set of group-by keys (e.g., using a GROUP BY ROLLUP clause). For example, in a query that comprises "group by rollup (c1, c2)," a group-by rollup operator can generate: results grouped by both c1 and c2; results grouped by just c1 (with null for c2); and a grand total with nulls for both columns.

As used herein, a group-by cube operator can comprise a query plan operator that extends a group-by rollup operation by adding all the "cross-tabulations" rows. With a group-by cube operator, sub-total rows are rows that further aggregate whose values are derived by computing the same aggregate functions that were used to produce the grouped rows.

Reference will now be made in detail to various example embodiments of the present disclosure, examples of which are illustrated in the appended drawings. The present disclosure may, however, be embodied in many different forms and should not be construed as being limited to the examples set forth herein.

FIG. 1 illustrates an example computing environment 100 comprising a database system in the example form of a network-based database system 102 that includes a query plan optimizer for top-k operators 130 (hereafter, the query plan optimizer 130), according to some example embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some example embodiments, the computing environment 100 may include a cloud computing platform 126 with the network-based database system 102, and a storage platform 104 (also referred to as a cloud storage platform). The cloud computing platform 126 provides computing resources and storage resources that may be acquired (purchased) or leased and configured to execute applications and store data.

Figure 2:
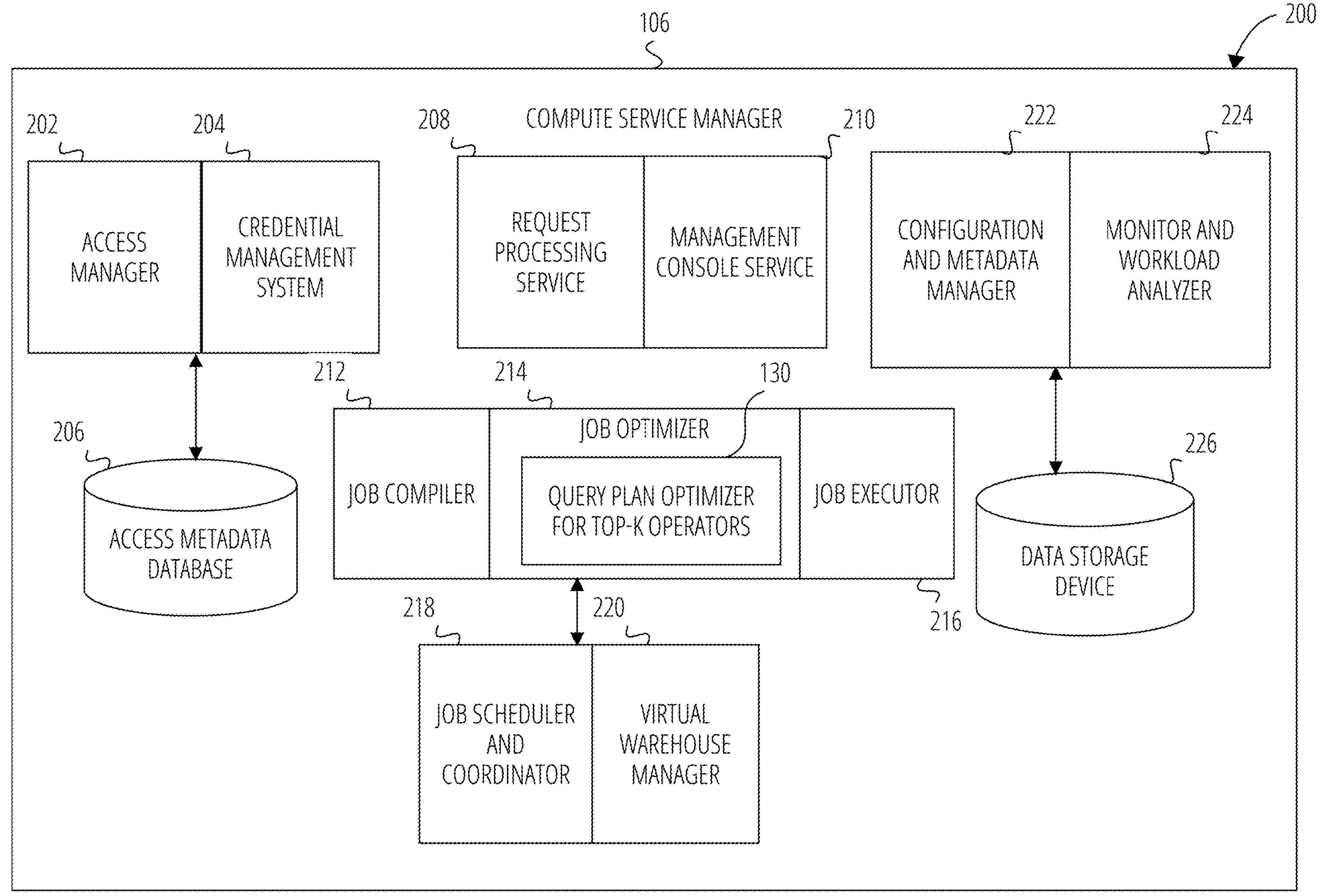
FIG. 2 is a block diagram illustrating components of a compute service manager, according to some example embodiments of the present disclosure.

The cloud computing platform 126 may host a cloud computing service 128 that facilitates storage of data on the cloud computing platform 126 (e.g., data management and access) and analysis functions (e.g., SQL queries, analysis), as well as other processing capabilities (e.g., configuring replication group objects as described herein). The cloud computing platform 126 may include a three-tier architecture: data storage (e.g., storage platforms 104), an execution platform 108 (e.g., providing query processing), and a compute service manager 106 providing cloud services. Though shown to be part of the network-based database system 102, the query plan optimizer 130 can be part of (e.g., included by) the compute service manager 106, as shown in FIG. 2.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 126 could also use a cloud-storage platform as what is referred to herein as an internal storage location concerning the data platform.

From the perspective of the network-based database system 102 of the cloud computing platform 126, one or more files that are stored at one or more storage locations are referred to herein as being organized into one or more of what is referred to herein as either "internal stages" or "external stages." Internal stages (e.g., internal stage 124) are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 126 is in communication with the storage platforms 104 and cloud-storage platforms 120 (e.g., AWS®, Microsoft Azure Blob Storage®, or Google Cloud Storage). The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 106, an execution platform 108, and one or more metadata databases 110. The network-based database system 102 hosts and provides data reporting and analysis services to multiple client accounts.

The compute service manager 106 coordinates and manages operations of the network-based database system 102. The compute service manager 106 also performs query optimization and compilation (e.g., into a query plan) as well as managing clusters of computing services that provide compute resources (also referred to as "virtual warehouses"). The compute service manager 106 can support any number of client accounts such as end-users providing data storage and retrieval requests, system administrators managing the systems and methods described herein, and other components/devices that interact with compute service manager 106.

The compute service manager 106 is also in communication with a client device 112. The client device 112 corresponds to a user of one of the multiple client accounts supported by the network-based database system 102. A user may utilize the client device 112 to submit data storage, retrieval, and analysis requests to the compute service manager 106. Client device 112 (also referred to as remote computing device or user client device 112) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 126 (e.g., cloud computing service 128) by way of a network 116, such as the Internet or a private network. A data consumer 118 can use another computing device to access the data of the data provider (e.g., data obtained via the client device 112).

In the description below, actions are ascribed to users, particularly consumers and providers. Such actions shall be understood to be performed concerning client device (or devices) 112 operated by such users. For example, a notification to a user may be understood to be a notification transmitted to the client device 112, input or instruction from a user may be understood to be received by way of the client device 112, and interaction with an interface by a user shall be understood to be interaction with the interface on the client device 112. In addition, database operations (joining, aggregating, analysis, etc.) ascribed to a user (consumer or provider) shall be understood to include performing such actions by the cloud computing service 128 in response to an instruction from that user.

The compute service manager 106 is also coupled to one or more metadata databases 110 that store metadata about various functions and aspects associated with the network-based database system 102 and its users. For example, a metadata database 110 may include a summary of data stored in remote data storage systems as well as data available from a local cache. Additionally, a metadata database 110 may include information regarding how data is organized in remote data storage systems (e.g., the cloud storage platform 104) and the local caches. Information stored by a metadata database 110 allows systems and services to determine whether a piece of data needs to be accessed without loading or accessing the actual data from a storage device. In some example embodiments, metadata database 110 is configured to store account object metadata (e.g., account objects used in connection with a replication group object).

Figure 3:
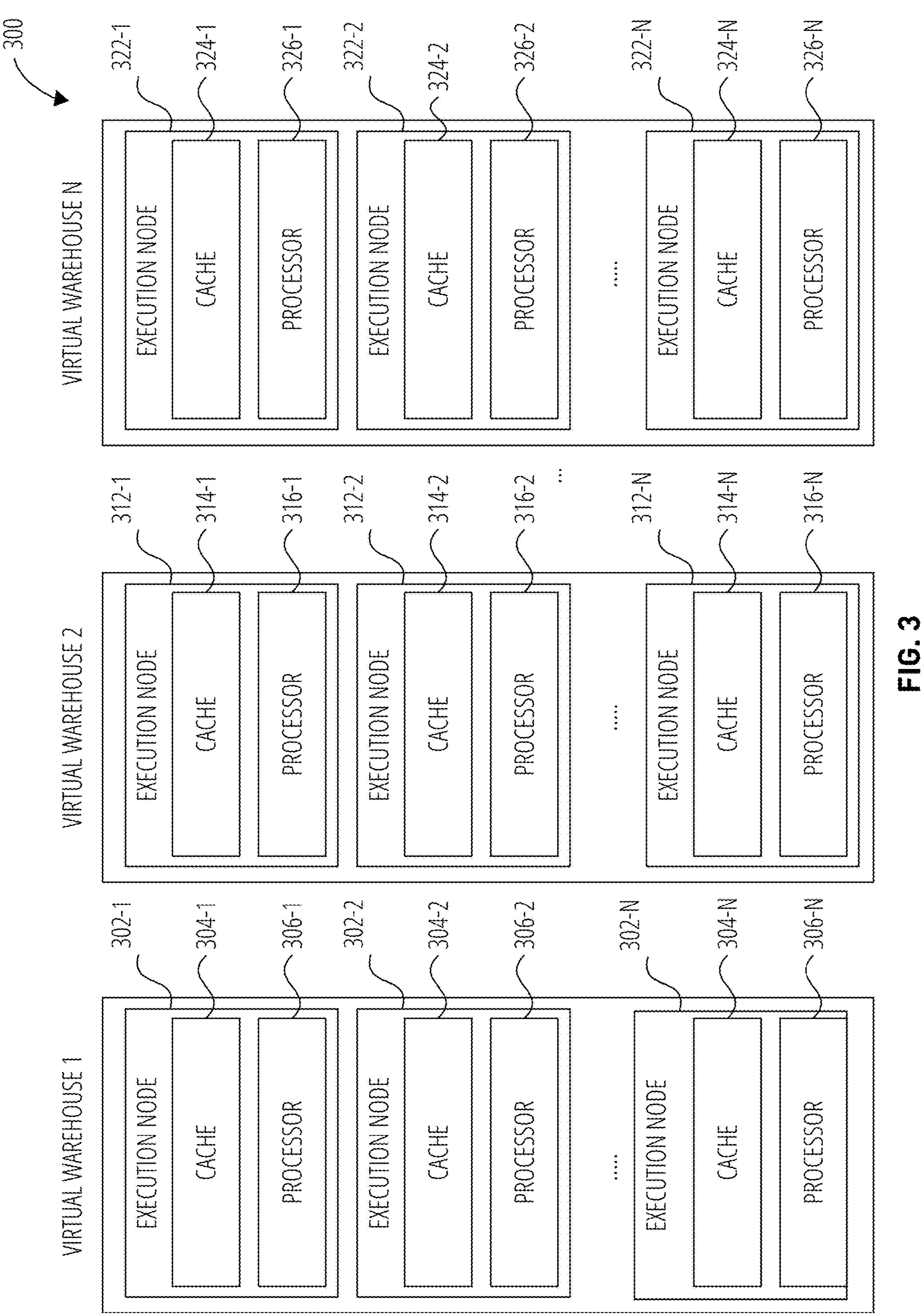
FIG. 3 is a block diagram illustrating components of an execution platform, according to some example embodiments of the present disclosure.

The compute service manager 106 is further coupled to the execution platform 108, which provides multiple computing resources that execute various data storage and data retrieval tasks. As illustrated in FIG. 3, the execution platform 108 comprises a plurality of compute nodes. The execution platform 108 is coupled to storage platform 104 and cloud-storage platforms 120. The storage platform 104 comprises multiple data storage devices 140-1 to 140-N. In some example embodiments, the data storage devices 140-1 to 140-N are cloud-based storage devices located in one or more geographic locations. For example, the data storage devices 140-1 to 140-N may be part of a public cloud infrastructure or a private cloud infrastructure. The data storage devices 140-1 to 140-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some example embodiments, at least one internal stage 124 may reside on one or more of the data storage devices 140-1-140-N, and at least one external stage 122 may reside on one or more of the cloud-storage platforms 120.

In some example embodiments, communication links between elements of the computing environment 100 are implemented via one or more data communication networks. These data communication networks may utilize any communication protocol and any type of communication medium. In some example embodiments, the data communication networks are a combination of two or more data communication networks (or sub-networks) coupled to one another. In alternative embodiments, these communication links are implemented using any type of communication medium and any communication protocol.

The compute service manager 106, metadata database(s) 110, execution platform 108, and storage platform 104, are shown in FIG. 1 as individual discrete components. However, each of the compute service manager 106, metadata database(s) 110, execution platform 108, and storage platform 104 may be implemented as a distributed system (e.g., distributed across multiple systems/platforms at multiple geographic locations). Additionally, each of the compute service manager 106, metadata database(s) 110, execution platform 108, and storage platform 104 can be scaled up or down (independently of one another) depending on changes to the requests received and the changing needs of the network-based database system 102. Thus, in the described example embodiments, the network-based database system 102 is dynamic and supports regular changes to meet the current data processing needs.

During a typical operation, the network-based database system 102 processes multiple jobs determined by the compute service manager 106. These jobs are scheduled and managed by the compute service manager 106 to determine when and how to execute the job. For example, the compute service manager 106 may divide the job into multiple discrete tasks and may determine what data is needed to execute each of the multiple discrete tasks. The compute service manager 106 may assign each of the multiple discrete tasks to one or more nodes of the execution platform 108 to process the task. The compute service manager 106 may determine what data is needed to process a task and further determine which nodes within the execution platform 108 are best suited to process the task. Some nodes may have already cached the data needed to process the task and, therefore, be a good candidate for processing the task. Metadata stored in a metadata database 110 assists the compute service manager 106 in determining which nodes in the execution platform 108 have already cached at least a portion of the data needed to process the task. One or more nodes in the execution platform 108 process the task using data cached by the nodes and, if necessary, data retrieved from the storage platform 104. It is desirable to retrieve as much data as possible from caches within the execution platform 108 because the retrieval speed is typically much faster than retrieving data from the storage platform 104.

As shown in FIG. 1, the cloud computing platform 126 of the computing environment 100 separates the execution platform 108 from the storage platform 104. In this arrangement, the processing resources and cache resources in the execution platform 108 operate independently of the data storage devices 140-1 to 140-N in the storage platform 104. Thus, the computing resources and cache resources are not restricted to specific data storage devices 140-1 to 140-N. Instead, all computing resources and all cache resources may retrieve data from, and store data to, any of the data storage resources in the storage platform 104.

As also shown, the job optimizer 214 comprises the query plan optimizer 130, which enables the network-based database system 102 (e.g., one or more of its components) to optimize a query plan for executing a query (e.g., received from the client device 112) by pushing down top-k information in the query plan, in accordance with various example embodiments described herein. According to various example embodiments, top-k information (e.g., top-k hint) from a top-k operator of a query plan is able to be pushed through a group-by grouping sets operator or a window function operator (e.g., window function filter) by pushing the top-k information to an aggregation operator associated with the group-by grouping sets operator/window function operator in response to determining (e.g., confirming) that a set of applicable conditions is satisfied. For some example embodiments, upon the top-k information being pushed into an aggregation operator, the aggregation operator is changed to a top-k aggregation operator, where the implementation of one or more top-k operations by the top-k aggregation operator can facilitate relaxation of conditions for pushing top-k information. For instance, where an example embodiment implements top-k aggregation operator using an ordered set (e.g., B-tree data structure), the example embodiment can use relaxed conditions for pushing top-k information (from a top-k operator) to an aggregation operator in connection with a window function operator and changed to a top-k aggregation operator. For example, the example set of conditions can include the condition that the window function operator's set of partition keys is a prefix of a set of order-by keys of the top-k operator but not need to include the condition that the window function operator's limit constraint is greater than or equal to a limit constraint of the top-k operator.

FIG. 2 is a block diagram 200 illustrating components of the compute service manager 106, according to some example embodiments of the present disclosure. As shown in FIG. 2, the compute service manager 106 includes an access manager 202 and a credential management system 204 coupled to access metadata database 206, which is an example of the metadata database(s) 110. As shown, the compute service manager 106 can include at least some portion of the query plan optimizer 130 to implement one or more features of optimizing a query plan in accordance with various example embodiments.

Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service execution platform 108 may determine the data to process a received query (e.g., a data storage request or data retrieval request). The data can be stored in a cache within the execution platform 108 or in a data storage device in storage platform 104.

A management console service 210 supports access to various systems and processes by administrators and other system managers. Additionally, the management console service 210 may receive a request to execute a job and monitor the workload on the system.

The compute service manager 106 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 106.

A job scheduler and coordinator 218 sends received jobs to the appropriate services or systems for compilation, optimization, and dispatch to the execution platform 108. For example, jobs can be prioritized and then processed in that prioritized order. In an embodiment, the job scheduler and coordinator 218 determines a priority for internal jobs that are scheduled by the compute service manager 106 with other "outside" jobs such as user queries that can be scheduled by other systems in the database but may utilize the same processing resources in the execution platform 108. In some example embodiments, the job scheduler and coordinator 218 identifies or assigns particular nodes in the execution platform 108 to process particular tasks. A virtual warehouse manager 220 manages the operation of multiple virtual warehouses implemented in the execution platform 108. For example, the virtual warehouse manager 220 may generate query plans for executing received queries.

Additionally, the compute service manager 106 includes a configuration and metadata manager 222, which manages the information related to the data stored in the remote data storage devices and in the local buffers (e.g., the buffers in execution platform 108). The configuration and metadata manager 222 uses metadata to determine which data files need to be accessed to retrieve data for processing a particular task or job. A monitor and workload analyzer 224 oversees processes performed by the compute service manager 106 and manages the distribution of tasks (e.g., workload) across the virtual warehouses and execution nodes in the execution platform 108. The monitor and workload analyzer 224 also redistributes tasks, as needed, based on changing workloads throughout the cloud computing platform 126 and may further redistribute tasks based on a user (e.g., "external") query workload that may also be processed by the execution platform 108. The configuration and metadata manager 222 and the monitor and workload analyzer 224 are coupled to a data storage device 226. Data storage device 226 in FIG. 2 represents any data storage device within the storage platform 104. For example, data storage device 226 may represent buffers in execution platform 108, storage devices in cloud storage platform 104, or any other storage device.

As described in embodiments herein, the compute service manager 106 validates all communication from an execution platform (e.g., the execution platform 108) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

FIG. 3 is a block diagram 300 illustrating components of the execution platform 108, according to some example embodiments of the present disclosure. As shown in FIG. 3, the execution platform 108 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 108 can add new virtual warehouses and drop existing virtual warehouses in real-time based on the current processing needs of the systems and users. This flexibility allows the execution platform 108 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 140-1 to 140-N shown in FIG. 1. Thus, the virtual warehouses are not necessarily assigned to a specific data storage device 140-1 to 140-N and, instead, can access data from any of the data storage devices 140-1 to 140-N within the storage platform 104. Similarly, each of the execution nodes shown in FIG. 3 can access data from any of the data storage devices 140-1 to 140-N. In some example embodiments, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some example embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some example embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some example embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 108, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some example embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 108 is also fault tolerant. For example, if one virtual warehouse fails, that virtual warehouse is quickly replaced with a different virtual warehouse at a different geographic location. A particular execution platform 108 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some example embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
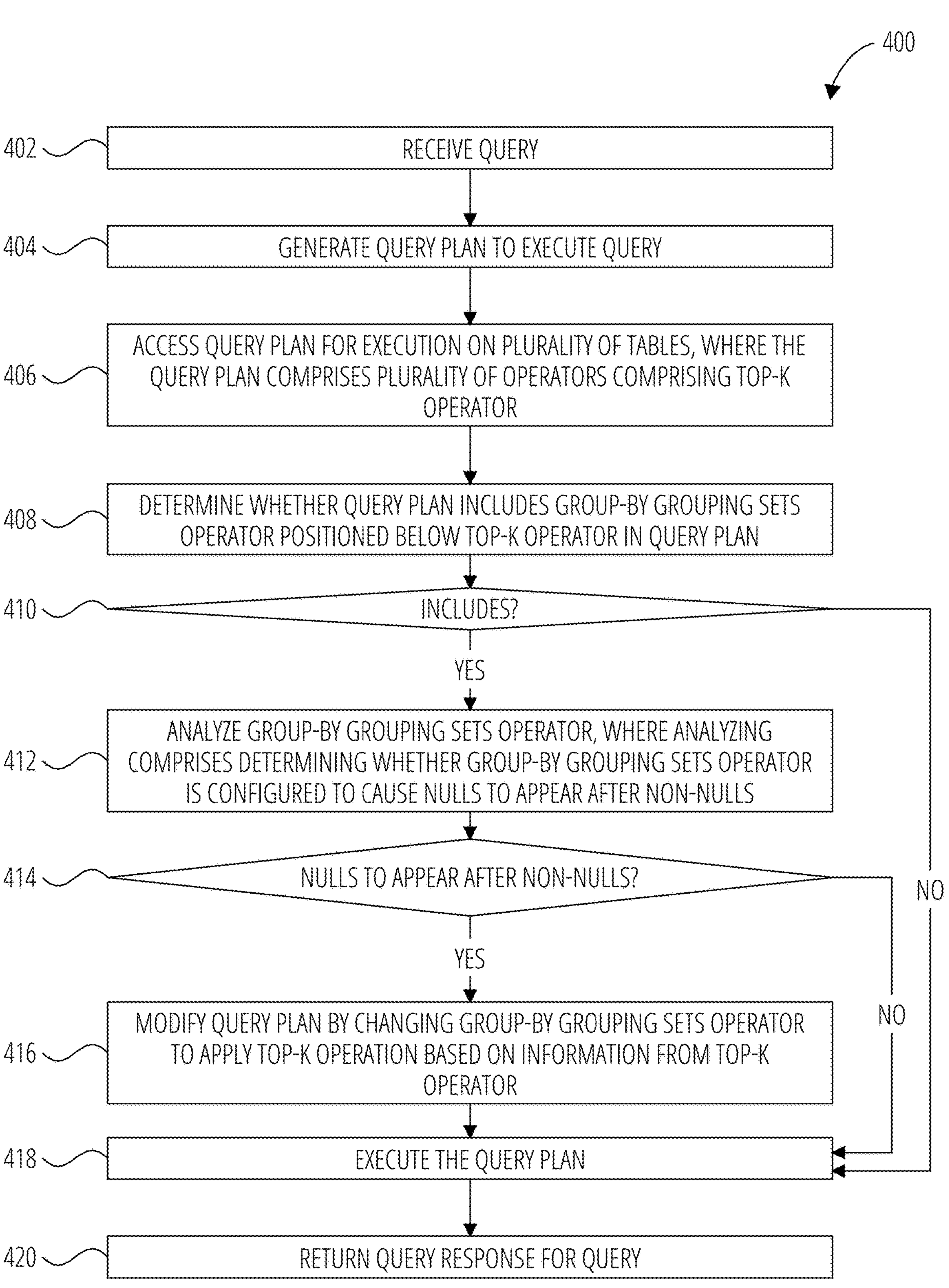
FIG. 4 is a flowchart of an example method for optimizing a query plan by pushing down top-k information in the query plan with respect to a group-by grouping sets operator, according to some example embodiments of the present disclosure.

FIG. 4 is a flowchart of an example method 400 for optimizing a query plan by pushing down top-k information in the query plan with respect to a group-by grouping sets operator, according to some example embodiments of the present disclosure. Method 400 may be embodied in computer-readable instructions for execution by one or more hardware components (e.g., one or more processors) such that one or more operations of method 400 can be performed by components of the network-based database system 102, such as the query plan optimizer 130, which may be implemented by machine 700 of FIG. 7. Accordingly, method 400 is described below, by way of example with reference thereto. However, it shall be appreciated that method 400 may be deployed on various other hardware configurations and is not intended to be limited to deployment within the network-based database system 102.

At operation 402, a processor (e.g., implementing the query plan optimizer 130) receives a query for execution on a database (e.g., one or more tables or views of the database). For some example embodiments, the query comprises a GROUP BY clause (e.g., GROUP BY ROLLUP) that specifies one or more group-by keys, an ORDER BY clause specifying one or more order-by keys, and a LIMIT clause specifying the specific number of rows. Based on the query, at operation 404 the processor generates a query plan (e.g., such as the example query plan 600 illustrated and described with respect to FIG. 6) to execute the query on the database.

For operation 406, the processor accesses the query plan for execution on a plurality of tables, where the query plan comprises a plurality of operators. According to various example embodiments, the plurality of operators comprises a top-k operator configured to order rows by a set of order-by keys and to limit a number of rows provided by the top-k operator to a specific number of rows.

At operation 408, the processor determines whether the query plan includes a group-by grouping sets operator positioned below the top-k operator in the query plan. Depending on the example embodiment, the group-by grouping sets operator can be a group-by rollup operator, a group-by cube operator, or the like. Depending on the example embodiment, the group-by grouping sets operator (e.g., such as a group-by rollup operator) can be implemented by two or more operators, which can include a union operator (e.g., union all operator) that performs a union of two or more fragments of the query plan under the union operator.

At decision point 410, in response to the processor determining that the query plan includes a group-by grouping sets operator positioned below the top-k operator in the query plan, method 400 proceeds to operation 412, otherwise method 400 eventually proceeds to operation 418 (e.g., after one or more other operations not shown in FIG. 4 are performed, such as operations 508 through 516 of FIG. 5).

During operation 412, the processor analyzes the group-by grouping sets operator, where the analyzing of the group-by grouping sets operator comprises determining whether the group-by grouping sets operator is configured to cause nulls to appear after non-nulls. For some example embodiments, the group-by grouping sets operator is configured to cause nulls to appear after non-nulls when the group-by grouping sets operator is configured to cause nulls to appear last with non-nulls in ascending order. Additionally, for some example embodiments, the group-by grouping sets operator is configured to cause nulls to appear after non-nulls when the group-by grouping sets operator is configured to cause nulls to appear prior to non-nulls in descending order.

Figure 5:
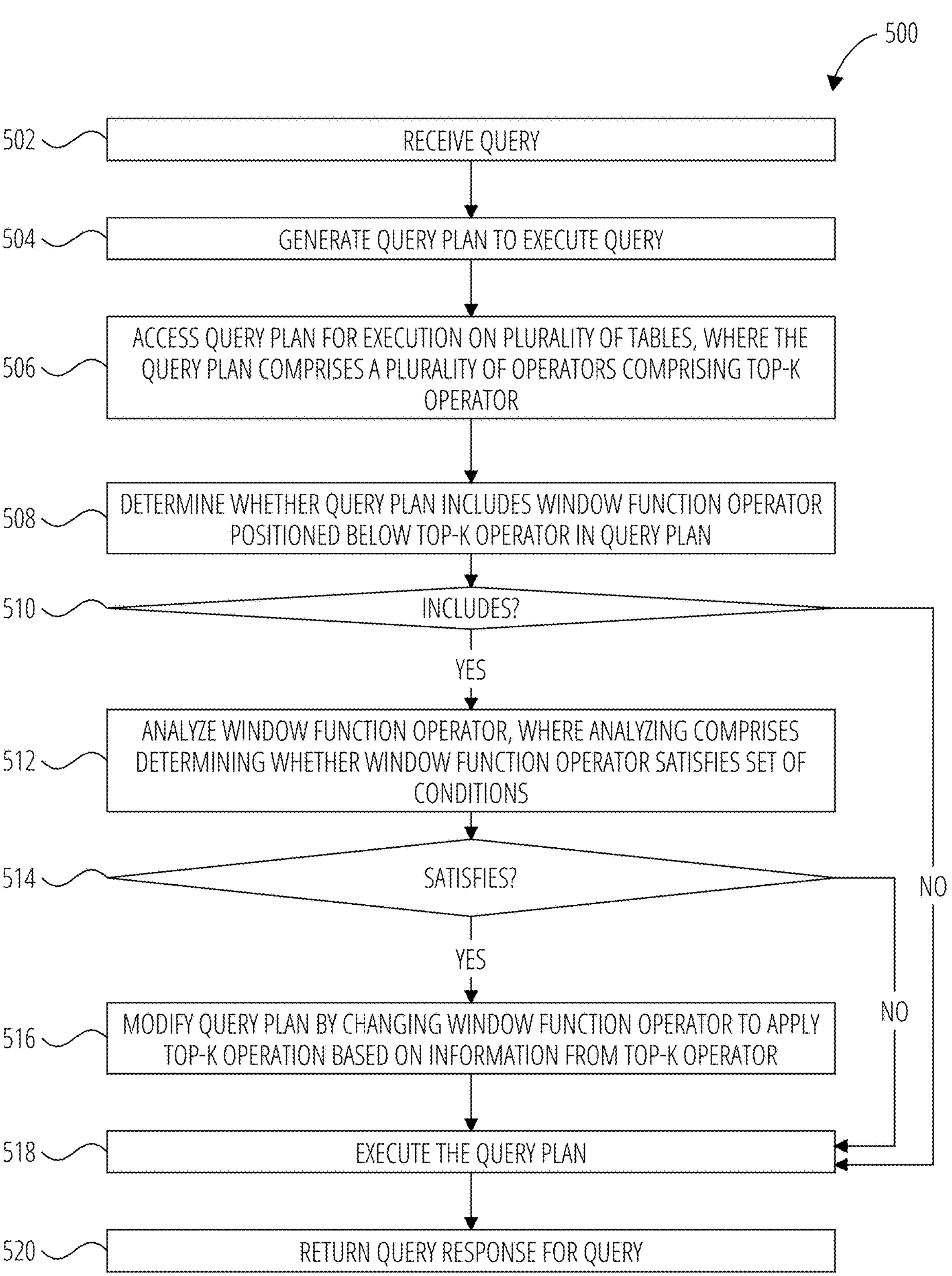
FIG. 5 is a flowchart of an example method for optimizing a query plan by pushing down top-k information in the query plan with respect to a window function operator, according to some example embodiments of the present disclosure.

At decision point 414, in response to the processor determining that the group-by grouping sets operator is configured to cause nulls to appear after non-nulls, method 400 proceeds to operation 416, otherwise method 400 eventually proceeds to operation 418 (e.g., after one or more other operations not shown in FIG. 4 are performed, such as operations 508 through 516 of FIG. 5).

For operation 416, the processor modifies the query plan by changing an aggregation operator positioned below the group-by grouping sets operator in the query plan to apply a top-k operation based on information (e.g., top-k hint) from the top-k operator. In doing so, the information is pushed down the query plan, through the group-by grouping sets operator, and into the aggregation operator positioned below the group-by grouping sets operator in the query plan. When the aggregation operator is changed to apply the top-k operation based on the information, the aggregation operator is changed to a top-k aggregation operator. The information can comprise a limit of the top-k operator. Additionally, the information can comprise the set of order-by keys of the top-k operator. According to various example embodiments, the information from the top-k operator is pushed to the aggregation operator if the processor determines that the aggregation operator has a prefix of a set of group-by keys that includes a set of order-by keys of the top-k operator. The aggregation operator can be part of a series of aggregation operators positioned below the group-by grouping sets operator, where each aggregation operator in the series has a set of group-by keys that include the set of order-by keys of the top-k operator. For some example embodiments, the aggregation operator (receiving the information from the top-k operator) is positioned below a union operator of a set of operators implementing the group-by grouping sets operator.

Eventually, at operation 418, the processor executes the query plan on (e.g., with respect to) the database and, at operation 420, the processor returns a query response (generated from the execution) in response to the query.

Though illustrated, for some example embodiments, method 400 of FIG. 4 can be combined with method 500 of FIG. 5 into a single method that optimizes a query plan by pushing down top-k information in the query plan with respect to a window function operator or a window function operator.

FIG. 5 is a flowchart of an example method 500 for optimizing a query plan by pushing down top-k information in the query plan with respect to a window function operator, according to some example embodiments of the present disclosure. Method 500 may be embodied in computer-readable instructions for execution by one or more hardware components (e.g., one or more processors) such that one or more operations of method 500 can be performed by components of the network-based database system 102, such as the query plan optimizer 130, which may be implemented by machine 700 of FIG. 7. Accordingly, method 500 is described below, by way of example with reference thereto. However, it shall be appreciated that method 500 may be deployed on various other hardware configurations and is not intended to be limited to deployment within the network-based database system 102.

At operation 502, a processor (e.g., implementing the query plan optimizer 130) receives a query for execution on a database (e.g., one or more tables or views of the database). For some example embodiments, the query comprises a GROUP BY that specifies one or more group-by keys, an ORDER BY clause specifying one or more order-by keys, and a LIMIT clause specifying the specific number of rows. Additionally, the query can comprise a clause specifying a window function that will operate on a window defined by a PARTITION BY clause that specifies one or more partition keys and another ORDER BY clause for the window function. Examples of the window can include, without limitation, a count, average, or rank function (e.g., rank function assigns ranks to rows within one or more partitions defined by the set of partition keys). Based on the query, at operation 504 the processor generates a query plan to execute the query on the database.

For operation 506, the processor accesses the query plan for execution on a plurality of tables, where the query plan comprises a plurality of operators. According to various example embodiments, the plurality of operators comprises a top-k operator configured to order rows by a set of order-by keys and to limit a number of rows provided by the top-k operator to a specific number of rows.

At operation 508, the processor determines whether the query plan includes a window function operator positioned below the top-k operator in the query plan. Depending on the example embodiment, the window function operator can be implemented by two or more operators, and can include a filter operator.

At decision point 510, in response to the processor determining that the query plan includes a window function operator positioned below the top-k operator in the query plan, method 500 proceeds to operation 512, otherwise method 500 eventually proceeds to operation 518 (e.g., after one or more other operations not shown in FIG. 5 are performed, such as operations operation 408 through operation 416 of FIG. 4).

During operation 512, the processor analyzes the window function operator, where the analyzing of the window function operator comprises determining whether the window function operator satisfies a set of conditions. For some example embodiments, the set of conditions comprises a (first) condition that a set of partition keys of the window function operator is a prefix of the set of order-by keys. For instance, the processor can determine whether this condition is satisfied by comparing the set of partition keys to the set of order-by keys to verify whether the set of partition keys is contained within a beginning portion of the set of order-by keys. For various example embodiments, the set of conditions comprises a (second) condition that a window function limit specified in association with the window function operator is greater than or equal to the specific number of rows associated with the top-k operator. According to some example embodiments, the top-k aggregation operator is configured to check a number of unique groups in an ordered set of the top-k aggregation operator, such as a B-tree data structure. For some example embodiments, where an example embodiment implements top-k operators using an ordered set, the set of conditions includes only the first condition (that a set of partition keys of the window function operator is a prefix of the set of order-by keys).

At decision point 514, in response to the processor determining that the window function operator satisfies the set of conditions, method 500 proceeds to operation 516, otherwise method 500 eventually proceeds to operation 518 (e.g., after one or more other operations not shown in FIG. 5 are performed, such as operations 408 through 416 of FIG. 4).

For operation 516, the processor modifies the query plan by changing an aggregation operator positioned below the window function operator in the query plan to apply a top-k operation based on information (e.g., top-k hint) from the top-k operator. When the aggregation operator is changed to apply the top-k operation based on the information, the aggregation operator is changed to a top-k aggregation operator. In doing so, the information is pushed down the query plan, through the window function operator, and into the aggregation operator positioned below the window function operator in the query plan. As described herein, the information can comprise a limit of the top-k operator. Additionally, the information can comprise the set of order-by keys of the top-k operator. According to various example embodiments, the information from the top-k operator is pushed to the aggregation operator if the processor determines that the aggregation operator has a set of group-by keys that includes a prefix of a set of order-by keys of the top-k operator. The aggregation operator can be part of a series of aggregation operators positioned below the window function operator, where each aggregation operator in the series has a set of group-by keys that include the set of order-by keys of the top-k operator.

Eventually, at operation 518, the processor executes the query plan on (e.g., with respect to) the database and, at operation 520, the processor returns a query response (generated from the execution) in response to the query.

Though illustrated, for some example embodiments, method 500 of FIG. 5 can be combined with method 400 of FIG. 4 into a single method that optimizes a query plan by pushing down top-k information in the query plan with respect to a group-by grouping sets operator or a window function operator.

Figure 6:
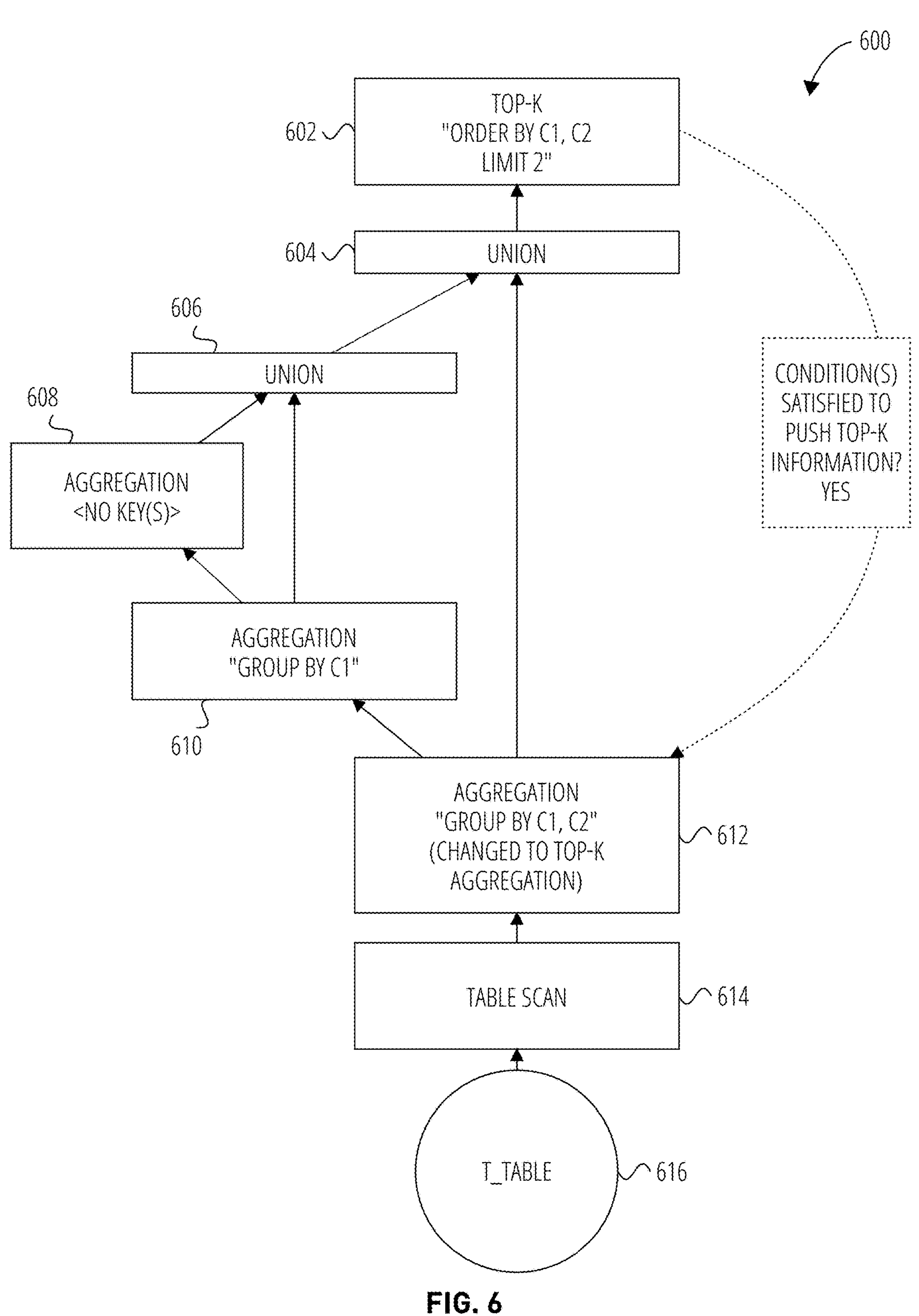
FIG. 6 is a diagram illustrating an example query plan that is optimized by pushing down top-k information in the query plan, according to some example embodiments of the present disclosure.

FIG. 6 is a diagram illustrating an example query plan 600 that is optimized by pushing down top-k information in the query plan, according to some example embodiments of the present disclosure.

Referring now to FIG. 6, the query plan 600 represents at least a portion of a query plan generated (e.g., by network-based database system 102) for the example query illustrated in Table 1. As shown, the example query of Table 1 comprises a GROUP BY ROLLUP clause for a group-by rollup query operation and an ORDER BY clause for a top-k query operation.

TABLE 1

```
select c1, c2, sum (c3)
from t
group by rollup (c1, c2)
order by c1, c2 limit 2
```

As shown, the query plan 600 comprises top-k operator 602 (having an order-by key of c1, c2 and a limit value of 2), union operators 604, 606 for implementing the group-by rollup operator within the query plan 600, aggregation 608 (having no keys), aggregation operator 610 (having group-by key c1), aggregation operator 612 (having group-by keys c1, c2), and table scan operator 614 (of t_table 616).

Various example embodiments first determine that information (e.g., top-k hint) of top-k operator 602 can be pushed down to aggregation operator 612, below the union operator 604, in response to determining that the group-by grouping sets operator (implemented by union operator 604 and aggregation 608) is configured to cause nulls to appear after non-nulls and in response to determining that the aggregation 608 has a set of group-by keys (c1 and c2) that include a prefix of a set of order-by keys of the top-k operator 602 (c1 and c2). By pushing the information from the top-k operator 602 to the aggregation 608, the aggregation 608 is turned into a top-k aggregation operator (that performs one or more top-k operations based on the information, such as the order-by key c1, c2 and limit value of 2).

Figure 7:
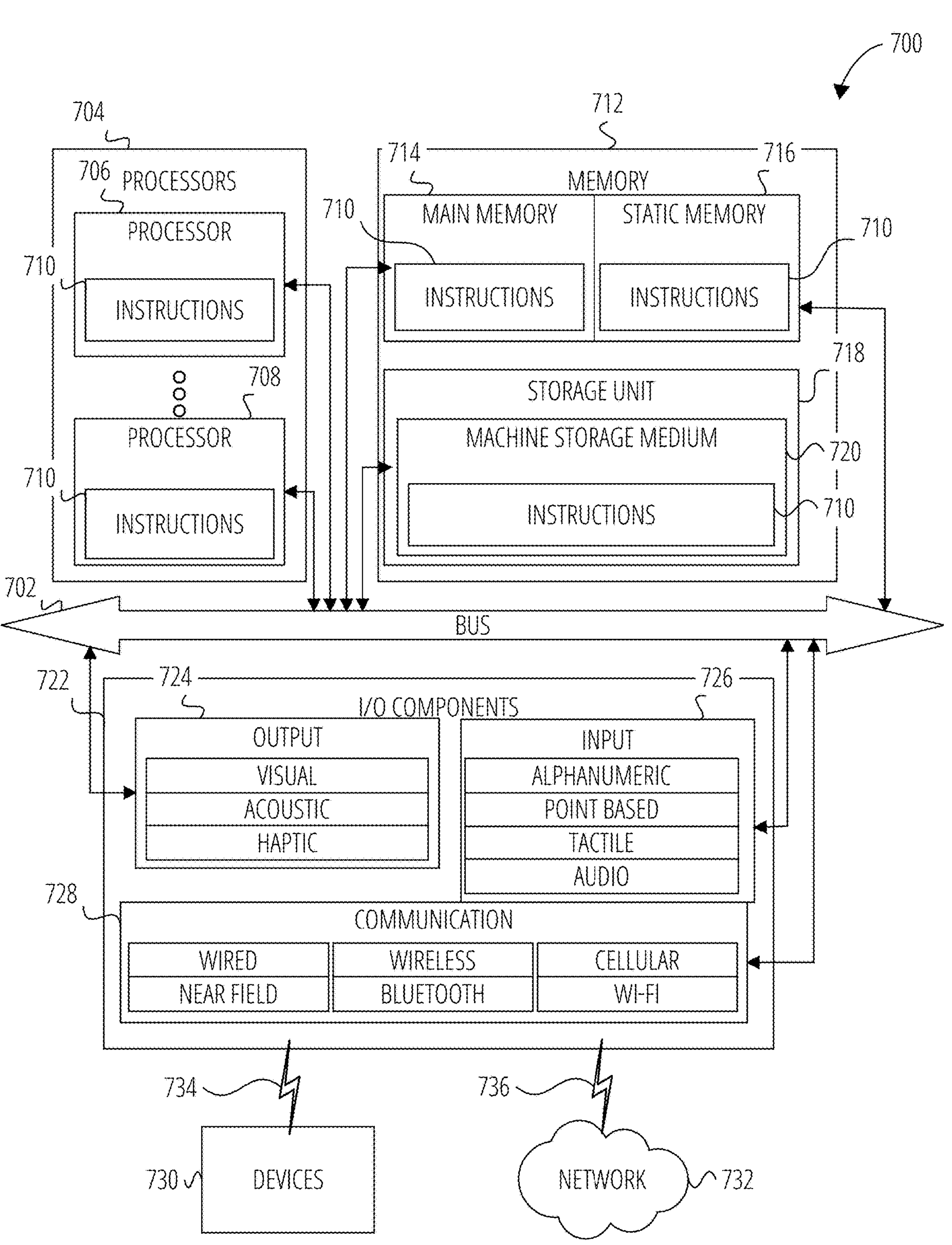
FIG. 7 illustrates a diagrammatic representation of a machine in the form of a computer system within which a set of instructions can be executed for causing the machine to perform any one or more of the methodologies discussed herein, according to some example embodiments of the present disclosure.

FIG. 7 illustrates a diagrammatic representation of a machine 700 in the form of a computer system within which a set of instructions can be executed for causing the machine 700 to perform any one or more of the methodologies discussed herein, according to some example embodiments of the present disclosure. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein can be executed. For example, the instructions 710 may cause the machine 700 to execute any one or more operations of any one or more of the methods described herein. As another example, the instructions 710 may cause the machine 700 to implement portions of the data flows described herein. In this way, the instructions 710 transform a general, non-programmed machine into a particular machine 700 (e.g., the compute service manager 106, the execution platform 108, client device 112) that is specially configured to carry out any one of the described and illustrated functions in the manner described herein.

In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines machine 700 that individually or jointly execute the instructions 710 to perform any one or more of the methodologies discussed herein.

The machine 700 includes processors 704, memory 712, and input/output (I/O) components 722 configured to communicate with each other such as via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 706 and a processor 708 that may execute the instructions 710. The term "processor" is intended to include multi-core processors 704 that may comprise two or more independent processors (sometimes referred to as "cores") that may execute instructions 710 contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory 712 may include a main memory 714, a static memory 716, and a storage unit 718, all accessible to the processors 704 such as via the bus 702. The main memory 714, the static memory 716, and the storage unit 718 comprising a machine storage medium 720 may store the instructions 710 embodying any one or more of the methodologies or functions described herein. The instructions 710 may also reside, completely or partially, within the main memory 714, within the static memory 716, within the storage unit 718, within at least one of the processors 704 (e.g., within the processor's cache memory), or any suitable combination thereof, during execution thereof by the machine 700.

The I/O components 722 include components to receive input, provide output, produce output, transmit information, exchange information, capture measurements, and so on. The specific I/O components 722 that are included in a particular machine 700 will depend on the type of machine. For example, portable machines such as mobile phones will likely include a touch input device or other such input mechanisms, while a headless server machine will likely not include such a touch input device. It will be appreciated that the I/O components 722 may include many other components that are not shown in FIG. 7. The I/O components 722 are grouped according to functionality merely for simplifying the following discussion and the grouping is in no way limiting. In various example embodiments, the I/O components 722 may include output components 724 and input components 726. The output components 724 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 722 may include communication components 728 operable to couple the machine 700 to a network 732 via a coupling 736 or to devices 730 via a coupling 734. For example, the communication components 728 may include a network interface component or another suitable device to interface with the network 732. In further examples, the communication components 728 may include wired communication components, wireless communication components, cellular communication components, and other communication components to provide communication via other modalities. The devices 730 can be another machine or any of a wide variety of peripheral devices (e.g., a peripheral device coupled via a universal serial bus (USB)). For example, as noted above, the machine 700 may correspond to any client device, the compute service manager 106, the execution platform 108, and the devices 730 may include any other of these systems and devices.

The various memories (e.g., 712, 714, 716, and/or memory of the processor(s) 704 and/or the storage unit 718) may store one or more sets of instructions 710 and data structures (e.g., software) embodying or utilized by any one or more of the methodologies or functions described herein. These instructions 710, when executed by the processor(s) 704, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 732 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 732 or a portion of the network 732 may include a wireless or cellular network, and the coupling 736 can be a Code Division Multiple Access (CDMA) connection, a Global System for Mobile communications (GSM) connection, or another type of cellular or wireless coupling. In this example, the coupling 736 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 710 can be transmitted or received over the network 732 using a transmission medium via a network interface device (e.g., a network interface component included in the communication components 728) and utilizing any one of a number of well-known transfer protocols (e.g., hypertext transfer protocol (HTTP)). Similarly, the instructions 710 can be transmitted or received using a transmission medium via the coupling 734 (e.g., a peer-to-peer coupling) to the devices 730. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 710 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one processor; and at least one memory storing instructions that cause the at least one processor to perform operations comprising: accessing a query plan for execution on a set of tables, the query plan comprising a plurality of operators, the plurality of operators comprising a top-k operator configured to order rows by a set of order-by keys and to limit a number of rows provided by the top-k operator to a specific number of rows; determining whether the query plan includes, a group-by grouping sets operator positioned below the top-k operator in the query plan; and in response to determining that the query plan includes the group-by grouping sets operator positioned below the top-k operator: analyzing the group-by grouping sets operator, the analyzing of the group-by grouping sets operator comprises determining whether the group-by grouping sets operator is configured to cause nulls to appear after non-nulls; and in response to determining that the group-by grouping sets operator is configured to cause nulls to appear after non-nulls, modifying the query plan by changing an aggregation operator positioned below the group-by grouping sets operator in the query plan to apply a top-k operation based on information from the top-k operator; and executing the query plan.

In Example 2, the subject matter of Example 1 includes, wherein a set of group-by keys of the aggregation operator includes a prefix of a set of order-by keys of the top-k operator.

In Example 3, the subject matter of Examples 1-2 includes, wherein the aggregation operator is positioned below a union operator of a set of operators implementing the group-by operator.

In Example 4, the subject matter of Examples 1-3 includes, wherein the group-by grouping sets operator is configured to cause nulls to appear after non-nulls when the group-by grouping sets operator is configured to cause nulls to appear last with non-nulls in ascending order.

In Example 5, the subject matter of Examples 1-4 includes, wherein the group-by grouping sets operator is configured to cause nulls to appear after non-nulls when the group-by grouping sets operator is configured to cause nulls to appear prior to non-nulls in descending order.

In Example 6, the subject matter of Examples 1-5 includes, wherein the aggregation operator is a first aggregation operator, and wherein the operations comprise: determining whether the query plan includes a window function operator positioned below the top-k operator in the query plan; and in response to determining that the query plan includes the window function operator positioned below the top-k operator: analyzing the window function operator to determine whether the window function operator satisfies a set of conditions, the set of conditions comprising a condition that a set of partition keys of the window function operator is a prefix of the set of order-by keys; and in response to determining that the window function operator satisfies the set of conditions, modifying the query plan by changing a second aggregation operator positioned below the window function operator in the query plan to apply the top-k operation based on the information from the top-k operator.

In Example 7, the subject matter of Example 6 includes, wherein a set of group-by keys of the second aggregation operator includes a prefix of a set of order-by keys of the top-k operator.

In Example 8, the subject matter of Example 7 includes, wherein the second aggregation operator is changed to a top-k aggregation operator, and wherein the top-k aggregation operator is configured to check a number of unique groups in an ordered set of the top-k aggregation operator.

In Example 9, the subject matter of Examples 6-8 includes, wherein the determining of whether the window function operator satisfies the set of conditions comprises: comparing the set of partition keys to the set of order-by keys to verify whether the set of partition keys is contained within a beginning portion of the set of order-by keys.

In Example 10, the subject matter of Examples 6-9 includes, wherein the condition is a first condition, and wherein the set of conditions comprises a second condition that a window function limit specified in association with the window function operator is greater than or equal to the specific number of rows associated with the top-k operator.

In Example 11, the subject matter of Examples 6-10 includes, wherein the window function operator comprises a rank function that assigns ranks to rows within one or more partitions defined by the set of partition keys.

In Example 12, the subject matter of Examples 6-11 includes, wherein the operations comprise: receiving a query that comprises a GROUP-BY clause that specifies one or more group-by keys, a PARTITION BY clause that specifies one or more partition keys, an ORDER BY clause specifying one or more order-by keys, and a LIMIT clause specifying the specific number of rows; and based on the query, generating the query plan to execute the query.

In Example 13, the subject matter of Examples 1-12 includes, wherein the operations comprise: receiving a query that comprises a GROUP BY clause that specifies one or more group-by keys, an ORDER BY clause specifying one or more order-by keys, and a LIMIT clause specifying the specific number of rows; and based on the query, generating the query plan to execute the query.

Example 14 is a method to implement any of Examples 1-13.

Example 15 is a machine-storage medium storing instructions that when executed by a machine, cause the machine to perform operations to implement any of Examples 1-13.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various example embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one processor; and
at least one memory storing instructions that cause the at least one processor to perform operations comprising:
accessing a query plan for execution on a set of tables, the query plan comprising a plurality of operators, the plurality of operators comprising a top-k operator configured to order rows by a set of order-by keys and to limit a number of rows provided by the top-k operator to a specific number of rows;
determining whether the query plan includes a group-by grouping sets operator positioned below the top-k operator in the query plan;
in response to determining that the query plan includes the group-by grouping sets operator positioned below the top-k operator:
analyzing the group-by grouping sets operator, the analyzing of the group-by grouping sets operator comprises determining whether the group-by grouping sets operator is configured to cause nulls to appear after non-nulls; and
in response to determining that the group-by grouping sets operator is configured to cause nulls to appear after non-nulls, modifying the query plan by changing a first aggregation operator positioned below the group-by grouping sets operator in the query plan to apply a top-k operation based on information from the top-k operator;
determining whether the query plan includes a window function operator positioned below the top-k operator in the query plan;
in response to determining that the query plan includes the window function operator positioned below the top-k operator:

analyzing the window function operator to determine whether the window function operator satisfies a set of conditions, the set of conditions comprising a condition that a set of partition keys of the window function operator is a prefix of the set of order-by keys; and in response to determining that the window function operator satisfies the set of conditions, modifying the query plan by changing a second aggregation operator positioned below the window function operator in the query plan to apply the top-k operation based on the information from the top-k operator; and executing the query plan.

2. The system of claim 1, wherein a set of group-by keys of the first aggregation operator includes a prefix of a set of order-by keys of the top-k operator.

3. The system of claim 1, wherein the first aggregation operator is positioned below a union operator of a set of operators implementing the group-by grouping sets operator.

4. The system of claim 1, wherein the group-by grouping sets operator is configured to cause nulls to appear after non-nulls when the group-by grouping sets operator is configured to cause nulls to appear last with non-nulls in ascending order.

5. The system of claim 1, wherein the group-by grouping sets operator is configured to cause nulls to appear after non-nulls when the group-by grouping sets operator is configured to cause nulls to appear prior to non-nulls in descending order.

6. The system of claim 1, wherein a set of group-by keys of the second aggregation operator includes a prefix of a set of order-by keys of the top-k operator.

7. The system of claim 6, wherein the second aggregation operator is changed to a top-k aggregation operator, and wherein the top-k aggregation operator is configured to check a number of unique groups in an ordered set of the top-k aggregation operator.

8. The system of claim 1, wherein the determining of whether the window function operator satisfies the set of conditions comprises:

comparing the set of partition keys to the set of order-by keys to verify whether the set of partition keys is contained within a beginning portion of the set of order-by keys.

9. The system of claim 1, wherein the condition is a first condition, and wherein the set of conditions comprises a second condition that a window function limit specified in association with the window function operator is greater than or equal to the specific number of rows associated with the top-k operator.

10. The system of claim 1, wherein the window function operator comprises a rank function that assigns ranks to rows within one or more partitions defined by the set of partition keys.

11. The system of claim 1, wherein the operations comprise:

receiving a query that comprises a GROUP-BY clause that specifies one or more group-by keys, a PARTITION BY clause that specifies one or more partition keys, an ORDER BY clause specifying one or more order-by keys, and a LIMIT clause specifying the specific number of rows; and based on the query, generating the query plan to execute the query.

12. The system of claim 1, wherein the operations comprise:

receiving a query that comprises a GROUP BY clause that specifies one or more group-by keys, an ORDER BY clause specifying one or more order-by keys, and a LIMIT clause specifying the specific number of rows; and based on the query, generating the query plan to execute the query.

13. A method comprising:

accessing, by at least one processor, a query plan for execution a set of tables, the query plan comprising a plurality of operators, the plurality of operators comprising a top-k operator configured to order rows by a set of order-by keys and to limit a number of rows provided by the top-k operator to a specific number of rows;

determining, by the at least one processor, that the query plan includes a group-by grouping sets operator positioned below the top-k operator in the query plan;

in response to determining that the query plan includes the group-by grouping sets operator positioned below the top-k operator:

analyzing, by the at least one processor, the group-by grouping sets operator, the analyzing of the group-by grouping sets operator comprises determining that the group-by grouping sets operator is configured to cause nulls to appear after non-nulls; and in response to determining that the group-by grouping sets operator is configured to cause nulls to appear after non-nulls, modifying, by the at least one processor, the query plan by changing a first aggregation operator positioned below the group-by grouping sets operator in the query plan to apply a top-k operation based on information from the top-k operator;

determining, by the at least one processor, that the query plan includes a window function operator positioned below the top-k operator in the query plan;

in response to determining that the query plan includes the window function operator positioned below the top-k operator:

analyzing, by the at least one processor, the window function operator to determine that the window function operator satisfies a set of conditions, the set of conditions comprising a condition that a set of partition keys of the window function operator is a prefix of the set of order-by keys; and in response to determining that the window function operator satisfies the set of conditions, modifying, by the at least one processor, the query plan by changing a second aggregation operator positioned below the window function operator in the query plan to apply the top-k operation based on the information from the top-k operator; and executing, by the at least one processor, the query plan.

14. The method of claim 13, wherein a set of group-by keys of the first aggregation operator includes a set of order-by keys of the top-k operator.

15. The method of claim 13, wherein the first aggregation operator is positioned below a union operator of a set of operators implementing the group-by grouping sets operator.

16. The method of claim 13, wherein the group-by grouping sets operator is configured to cause nulls to appear after non-nulls when the group-by grouping sets operator is configured to cause nulls to appear last with non-nulls in ascending order.

17. The method of claim 13, wherein the group-by grouping sets operator is configured to cause nulls to appear after non-nulls when the group-by grouping sets operator is configured to cause nulls to appear prior to non-nulls in descending order.

18. A non-transitory machine-storage medium storing instructions that when executed by a machine, cause the machine to perform operations comprising:

accessing a query plan for execution on a set of tables, the query plan comprising a plurality of operators, the plurality of operators comprising a top-k operator configured to order rows by a set of order-by keys and to limit a number of rows provided by the top-k operator to a specific number of rows;

determining whether the query plan includes a group-by grouping sets operator positioned below the top-k operator in the query plan;

in response to determining that the query plan includes the group-by grouping sets operator positioned below the top-k operator:

analyzing the group-by grouping sets operator, the analyzing of the group-by grouping sets operator comprises determining whether the group-by grouping sets operator is configured to cause nulls to appear after non-nulls; and in response to determining that the group-by grouping sets operator is configured to cause nulls to appear after non-nulls, modifying the query plan by changing a first aggregation operator positioned below the group-by grouping sets operator in the query plan to apply a top-k operation based on information from the top-k operator;

determining whether the query plan includes a window function operator positioned below the top-k operator in the query plan;

in response to determining that the query plan includes the window function operator positioned below the top-k operator:

analyzing the window function operator to determine whether the window function operator satisfies a set of conditions, the set of conditions comprising a condition that a set of partition keys of the window function operator is a prefix of the set of order-by keys; and in response to determining that the window function operator satisfies the set of conditions, modifying the query plan by changing a second aggregation operator positioned below the window function operator in the query plan to apply the top-k operation based on the information from the top-k operator; and executing the query plan.

19. The non-transitory machine-storage medium of claim 18, wherein a set of group-by keys of the first aggregation operator includes a prefix of a set of order-by keys of the top-k operator.

20. The non-transitory machine-storage medium of claim 18, wherein the first aggregation operator is positioned below a union operator of a set of operators implementing the group-by grouping sets operator.

* * * * *